US008177478B2

(12) United States Patent
Stabins

(10) Patent No.: US 8,177,478 B2
(45) Date of Patent: May 15, 2012

(54) DARRIEUS WATER WHEEL TURBINE

(76) Inventor: Peter Andrew Stabins, Toronto (CA)

( * ) Notice: Subject to any disclaimer, the term of this patent is extended or adjusted under 35 U.S.C. 154(b) by 799 days.

(21) Appl. No.: 12/296,580

(22) PCT Filed: Apr. 10, 2007

(86) PCT No.: PCT/CA2007/000588
§ 371 (c)(1),
(2), (4) Date: Oct. 9, 2008

(87) PCT Pub. No.: WO2007/134424
PCT Pub. Date: Nov. 29, 2007

(65) Prior Publication Data
US 2009/0194997 A1    Aug. 6, 2009

(30) Foreign Application Priority Data

Apr. 12, 2006    (CA) .................... 2547748

(51) Int. Cl.
*F03D 7/00*    (2006.01)
(52) U.S. Cl. .................................. 415/4.1
(58) Field of Classification Search ........... 415/4.1, 415/3.1, 6, 7; 290/54
See application file for complete search history.

(56) References Cited

U.S. PATENT DOCUMENTS

| | | | |
|---|---|---|---|
| 3,978,345 A | 8/1976 | Bailey | |
| 5,451,138 A | 9/1995 | Istorik et al. | |
| 5,577,882 A | 11/1996 | Istorik et al. | |
| 5,642,984 A * | 7/1997 | Gorlov | 416/176 |
| 6,206,630 B1 * | 3/2001 | Feltenberger et al. | 415/3.1 |
| 2006/0008351 A1 | 1/2006 | Belinsky | |

OTHER PUBLICATIONS

J.J. Vocadlo, et al., "Hydraulic Kinetic Energy Conversion (HKEC) Systems", 1990 J. Energy Engineering 116(1), pp. 17-37.

Author Unknown, "Evaluation of Nova Energy Ltd's Hydro Turbine" for Ministry of Employment and Investment, Government of British Columbia, by H.N. Halvorson Consultants Ltd., Victoria, B.C., Dec. 9, 1994, (60 pages).
A. Gorlov, "Development of the Helical Reaction Hydraulic Turbine", for The U.S. Department of Energy, EE-20, Washington, DC, Aug. 1998, DOE/EE/15669-T1, (59 pages).
M. Shiono, et al., "An Experimental Study of the Characteristics of a Darrieus Turbine for Tidal Power Generation", Electrical Engineering in Japan, vol. 132, No. 3, 2000, pp. 38-47.
R.C. Reuter, et al., "Torque Ripple in a Vertical Axis Wind Turbine", Sandia Report, SAND78-0577-Unlimited Release-UC-60, Apr. 1978, (45 pages).
A.N. Gorban, et al., "Limits of the Turbine Efficiency for Free Fluid Flow", Journal of Energy Resources Technology by ASME, Dec. 2001, vol. 123, pp. 311-317.
J.D. Winchester, et al., "Torque ripple and variable blade force: A comparison of Darrieus and Gorlov-type turbines for tidal stream energy conversion", Proceedings of the 8th European Wave and Tidal Energy Conference, Uppsala, Sweden, 2009, pp. 668-676.

* cited by examiner

*Primary Examiner* — Ross Gushi

(57) ABSTRACT

A reaction turbine system for the generation of hydroelectricity is disclosed. It consists of a Darrieus type turbine with a horizontal axis of rotation. The blades may be straight or helical, and are held equidistant from the central rotating shaft by blade support members. The blades are oriented so that a blade at its rotational apex moves directly opposite to the direction of water flow. The turbine is elevated such that the top portion, where blades travel directly against the direction of water flow, is in the air and above the water level. This design greatly reduces stresses on the system and increases energy output relative to a Darrieus turbine fully immersed in water flow. This design also enables the turbine to self-start.

18 Claims, 3 Drawing Sheets

DARRIEUS WATER WHEEL TURBINE

TECHNICAL FIELD

This invention relates to reaction turbines for the generation of hydroelectricity.

BACKGROUND ART

Devices which take advantage of the energy in falling water have existed for several centuries. The earliest example is the water wheel. It is an impulse device which uses a multitude of buckets or paddles to catch falling or moving water, depositing it at a downstream point. The movement of the buckets or paddles spins a central supporting shaft which can do work or be used to generate power.

In the late 1800's and early 1900's hydro power innovators discovered the advantages of reaction turbines, which mainly generate power from pressure and energy differences in stream flow. These turbines extract more power from streams than water wheels, rotate at higher speeds and accept much larger water flow volumes. Reaction turbines, such as the Francis or Kaplan, are therefore almost exclusively used at high flow hydroelectric sites. Both of these designs utilize a rotating disc of blades oriented in a plane perpendicular to the direction of exit flow. Impulse hydro power generating devices are still used in high head (over 20 m) low flow applications (the Pelton design) and low head (3 m to 10 m) low flow applications (Cross-flow design).

The Francis, Kaplan, Pelton and Cross-flow hydro power designs are mature technologies and very well understood. None of these designs, however, is recommended for high-flow applications of less then 3 meters of head. The impulse designs cannot accept very large water flows while the Francis and Kaplan turbines are not practical. To utilize these large reaction turbines at low-head sites they must be partially elevated resulting in very low water pressures. Cavitation can result damaging the turbines and water transport surfaces. Variations on the Kaplan, such as the Starflow, inclined Kaplan and Bulb turbines, all of which are similar to water flowing through a propeller, have been recommended for low head situations, however, they are not economical for heads of less than 3 m and many rivers with higher heads and lesser flows.

One solution for economically generating power from ultra-low head hydro sites (less than 3 m of head) is adoption of the Darrieus turbine design. The Darrieus turbine was developed in France by Georges Darrieus in the 1920's to generate power from wind. It consists of a set of long, rectangular airfoils connected to a central rotating shaft. The airfoils may be curved to directly connect to the shaft or be straight and held parallel to the shaft by struts, arms or discs. These blades are thereby oriented transversely to the fluid flow and parallel to the axis of rotation. Significant testing in the 1980's and 1990's demonstrated the utility of this turbine design. Darrieus turbines were, however, not widely adopted for wind power as pinwheel type wind turbines were more economical.

In the early 1980's a Canadian innovator, Barry V. Davis, applied the vertical-axis Darrieus design to water. Several different models were successfully tested in the laboratory and various waterways. Government funding ended in the late 1980's, however, several organizations are presently attempting to utilize the Davis turbine design in ultra-low-head hydro and tidal applications.

DISCLOSURE OF THE INVENTION

While the Davis turbine demonstrates the applicability of the Darrieus design in water, there are three key drawbacks. The first is rotation about a vertical axis. To extract power from a wide river many Davis turbines located side by side would be required. This increases the quantity of moving parts, gears and generators, resulting in increased complexity and cost.

The second problem is the "counter-force effect" which causes excess stress on the system and reduces energy output. As a Darrieus turbine blade completes one full rotation around the central axis, the blade's angle of incidence relative to the direction of flow continuously changes. During this cycle the blade's movement is perpendicular to the flow twice, fully coincident with the flow once and fully against the flow once. When a blade is moving fully against the flow, the blade and turbine system experience a very high counter-force and stress relative to other rotational positions. This is the "counter-force effect". Over time this cyclical stress creates early fatigue failure of the blade and system. This instant of counter-force also reduces the extractable energy from the turbine as energy must be expended to push through the flow.

The third drawback is that classic Darrieus-type turbines are not self-starting. The counter-force effect brakes any rotation initiated by flow around the blades. Only after applying an external rotating force will the turbine have enough momentum to overcome the braking of the counter-force effect. Classic Darrieus-type turbines therefore require start-up motors or mechanisms.

It is an object of this invention to provide a simple, reliable, self-starting and low-cost Darrieus-type hydroelectric turbine system which eliminates the "counter-force effect" inherent to classical Darrieus turbine designs.

The present invention, which satisfies the foregoing objects, is a hydroelectric reaction turbine system consisting of a Darrieus type turbine with a horizontal axis of rotation and a portion of the turbine extending out of the water. In the invention's simplest form a long shaft is elevated at its ends by two supports. The supports permit rotation of the shaft and orient the longitudinal axis of shaft horizontally and perpendicular to the direction of water flow. Two blade support discs are connected at their rotational centres to the shaft. The face of each disc is perpendicular to the longitudinal axis of the shaft. Four wing-like turbine blades extend between the two discs. Each blade is parallel to the shaft and has a constant tear-drop airfoil profile along its longitudinal axis. The four blades are all equidistant from the shaft, dispersed at 90 degree intervals around the shaft and oriented to rotate the turbine in the direction which causes the blades to travel directly against the direction of water flow when at their apex. The turbine is located such that the top portion, where blades travel directly against the direction of water flow, is in the air and above the water level.

By having turbine blades rotating freely through the air when they are moving counter to the direction of water flow, the blades avoid having to move directly against the flow. The counter-force effect inherent to Darrieus type turbines is eliminated, greatly reducing stress on the system and increasing energy output. Such a turbine is also self-starting as no counter-force caused by the flow needs to be overcome.

Besides eliminating the counter-force effect, the invention is easily scalable and therefore more simple and economic than the Davis turbine. For example, to utilize the invention in a wide river the only adjustment is a longer set of blades. A single shaft, power generator and gearing system (if necessary) are required. In contrast, an equivalent Davis turbine system requires a multitude of vertical shafts, gears, generators and electrical systems, resulting in increased cost and complexity. Additional support structures are also necessary, increasing flow turbulence and decreasing energy conversion efficiency.

To further increase energy conversion efficiency the turbine can be sized to fully traverse the width and depth of the water flow channel. This arrangement forces all the water flow through the unit, permitting the Betz limit for energy conversion efficiency (59.3%) for turbines in open flow to be exceeded. Efficiencies approaching that of traditional reaction turbines are theoretically possible, without the construction of ducts, penstocks or tailraces.

BRIEF DESCRIPTION OF DRAWINGS

The invention can be better understood by reference to the accompanying drawings in which.

BEST AND OTHER MODES FOR CARRYING OUT THE INVENTION

Figure 1:
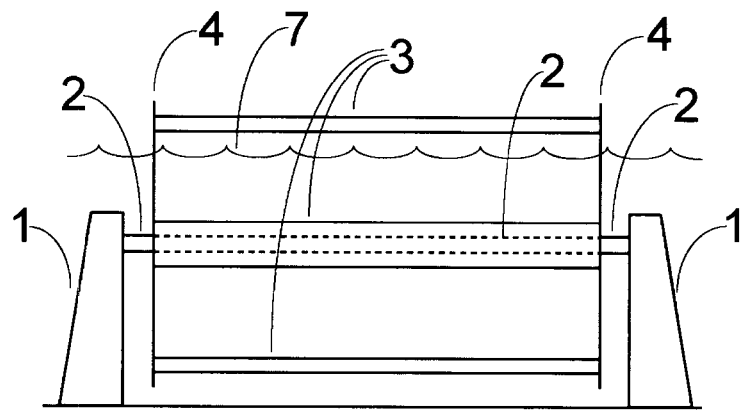
FIG. 1 is a frontal view down the direction of water flow of a straight-blade Darrieus turbine, according to the present invention.
Figure 2:
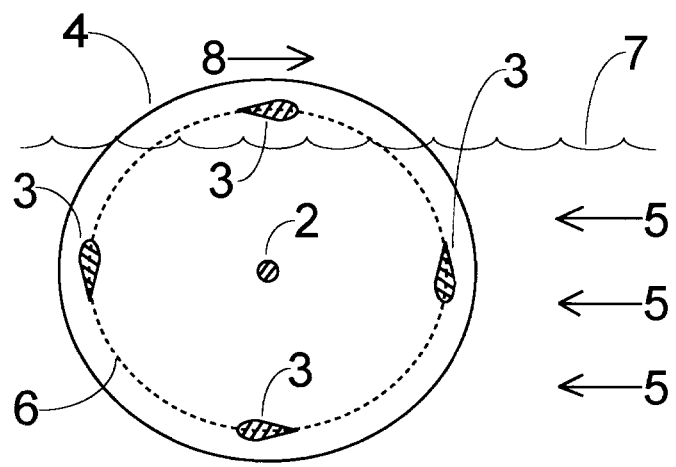
FIG. 2 is a cross-sectional view of the Darrieus turbine in FIG. 1.

FIG. 1 is a frontal view down the direction of water flow for the best embodiment of the invention. Shaft supports 1 elevate a shaft 2 and permit its rotation. The longitudinal axis of the shaft 2 is horizontal and perpendicular to the direction of water flow. Attached to the shaft are two blade support members 4, each one being either a disc, radial spokes or any other blade support mechanism known in the art. A set of wing-like airfoil blades 3 extend between the blade support members 4. Each blade 3 has a long rectangular profile between the two blade support members 4 and a constant teardrop airfoil cross-section along its longitudinal axis, as shown in FIG. 2. A blade 3 can be constructed from a solid and non-flexible material such as metal, aluminum or reinforced polymer. The water flowing past each blade 3 creates lift and some drag, causing the blade support members 4 to rotate. The shaft 2, which passes through the centre of each blade support member 4, is thereby rotated. A generator, gearing system and generator, or belt system and generator (none of which are shown) can be connected to the rotating shaft to generate electric power.

FIG. 2, the cross-sectional view of FIG. 1, helps explain rotation of the Darrieus turbine. Each blade 3 is mounted parallel to the shaft 2 and equidistant from the shaft 2, resulting in a circle of rotation 6 about the shaft. The chord of each airfoil generally forms a chord on an arc of the circle of rotation 6. In this embodiment the blades 3 are spaced equally around the circle of rotation 6. This provides for the smoothest production of power. Any number of blades may be provided, depending on energy conversion efficiency and shaft 2 rotation speed requirements. Adding blades 3 increases energy conversion efficiency but reduces shaft 2 rotational speed. Conversely, eliminating blades 3 reduces energy conversion efficiency but increases shaft 2 rotational speed. Adding too many blades 3 can choke water flow, create excess turbulence and reduce energy conversion efficiency.

Water flow in the direction of arrows 5 causes the Darrieus turbine in FIG. 2 to rotate clockwise, in the direction of arrow 8. As the top section of the circle of rotation 6 is in the air above the water flow, when a blade 3 is at the top of the circle of rotation 6 and at the only point where it moves directly against the direction of flow 5, the blade 3 does not have to be pushed through the fully opposite force of the flow. This greatly reduces the periodic stress exerted on the blade 3 and turbine and avoids the expenditure of energy to push through flow. The life of the turbine is extended and a higher energy output results relative to a Darrieus type turbine fully immersed in flowing water.

Figure 3:
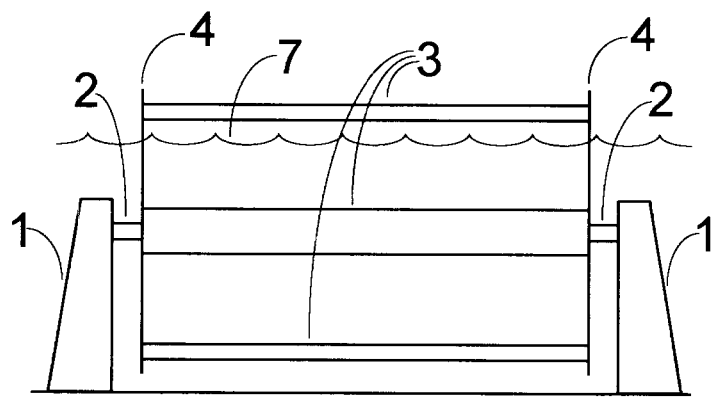
FIG. 3 is a frontal view down the direction of water flow of a straight-blade Darrieus turbine without a central shaft in the bladed section, according to another embodiment of the present invention.

FIG. 3 is the frontal view down the direction of water flow of an embodiment of the invention wherein the central shaft 2 is discontinued within the span between the blade support members 4. Other than the absence of a section of shaft 2, this embodiment is exactly same as the turbine described in FIGS. 1 and 2. The absence of a central shaft 2 between the blade support members 4 reduces water flow turbulence within the turbine, resulting in higher energy conversion.

Figure 4:
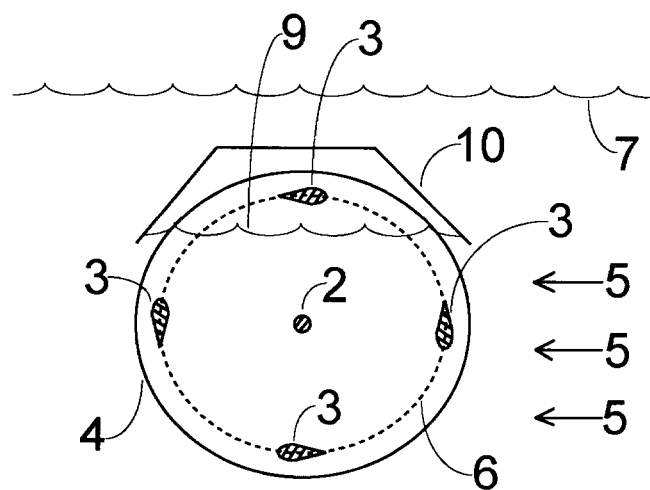
FIG. 4 is a cross-sectional view of a Darrieus turbine with an air pocket shell located fully under water, according to another embodiment of the present invention.

The basic premise of the invention can also be applied to a Darrieus turbine fully immersed in water flow. In FIG. 4 a Darrieus turbine as described in FIGS. 1 and 2 is located fully under the surface of flowing water. The only difference is the addition of an air pocket shell 10 along the top fraction of the turbine. The air pocket shell 10 is filled with air and traps the air, creating an air pocket water surface 9 below the apex of the turbine's circle of rotation 6. At the point where each blade 3 travels directly against the direction of water flow 5, the blade 3 travels through air and avoids being pushed through the fully opposite force of the flow. Periodic stress on the blades 3 and system is reduced and energy output of the turbine is increased.

Figure 5:
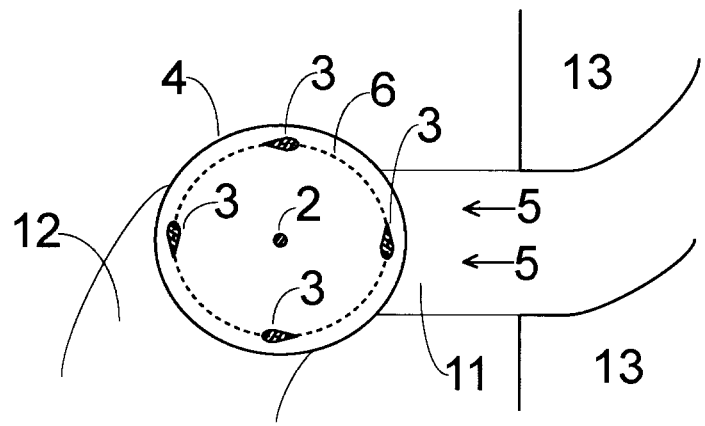
FIG. 5 is a cross-sectional view of a Darrieus turbine located in open air and in the direct path of a high pressure jet of water, according to another embodiment of the present invention.

FIG. 5 is an embodiment of the invention wherein a turbine of the type described in FIGS. 1 and 2 is placed in open air and receives a jet of water flow 11. Such a scenario might occur at a high-head hydroelectric site where water is held back by a dam 13 and is released at the bottom of the dam as a jet of water flow 11. The jet of water flow 11 is directed such that the top of the flow 11 strikes the turbine below the top of the circle of rotation 6. As the direction of flow 5 causes clockwise rotation of the turbine, when a blade 3 is at the apex of the circle of rotation 6 and moving directly against the direction of flow 5, the blade 3 remains in the air and does not have to be pushed through the fully opposite force of the flow. The flow, having provided much of its energy to the turbine, exits the turbine as a much slower jet of flow 12 with a more vertical trajectory.

Figure 6:
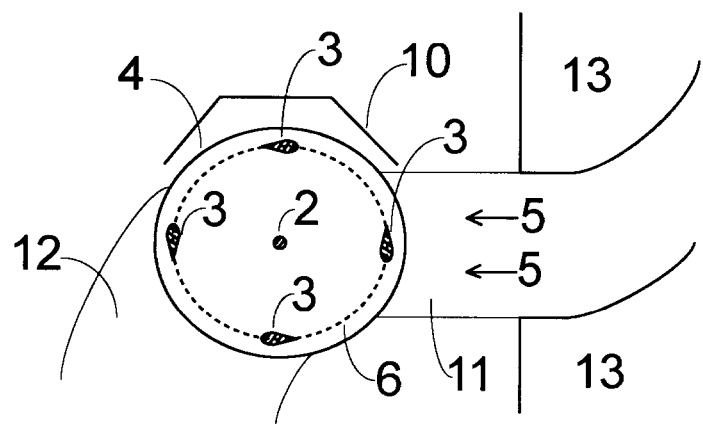
FIG. 6 is a cross-sectional view of a Darrieus turbine with an air pocket shell located in open air and in the direct path of a high pressure jet of water, according to another embodiment of the present invention.

The arrangement in FIG. 5 can be further improved by providing an air pocket shell 10 along the top fraction of the turbine, as shown in FIG. 6. The air pocket shell 10 provides blades 3 at their apex along the circle of rotation 6 direct physical protection from the incoming jet of water flow 11. Although good design should assure that the incoming jet of water flow 11 avoids the apex of the circle of rotation 6, conservative turbine system designers may desire the extra physical protection of the air pocket shell 10.

Figure 7:
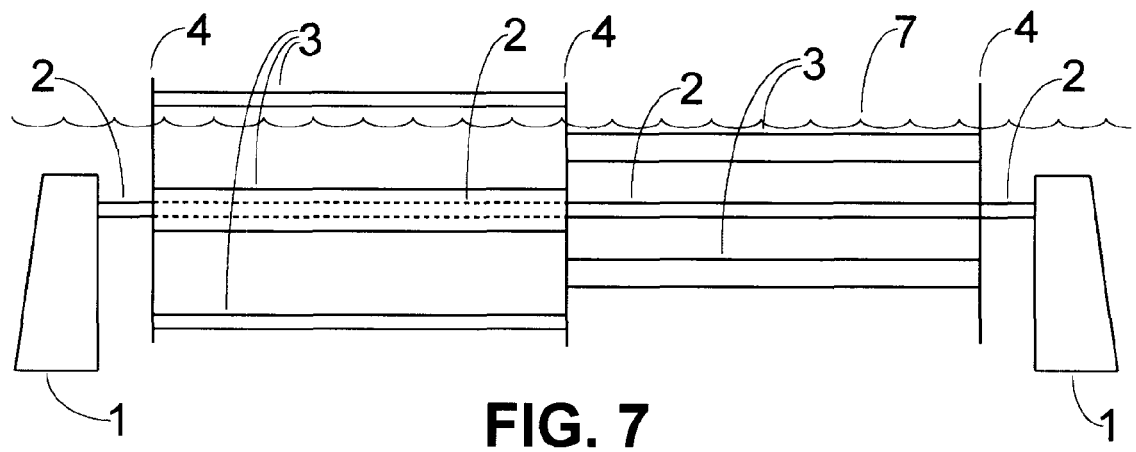
FIG. 7 is a frontal view down the direction of water flow of a Darrieus turbine system consisting of two Darrieus turbines offset and in series along the same central rotating shaft, according to another embodiment of the present invention.

FIGS. 1 to 6 contemplate use of a simple Darrieus turbine with one set of straight blades. The basic principle of the invention is also applicable to other Darrieus turbine designs which utilize a horizontal rotational axis. One such design is disclosed in FIG. 7, wherein multiple straight-blade Darrieus turbine runners are connected in series along a single horizontal rotating shaft 2. As in FIGS. 1 to 6, each turbine runner is located such that when a blade 3 is rotating directly against the direction of water flow, the blade travels in the air above the water surface 7 and avoids being pushed through the fully opposite force of the flow.

Figure 8:
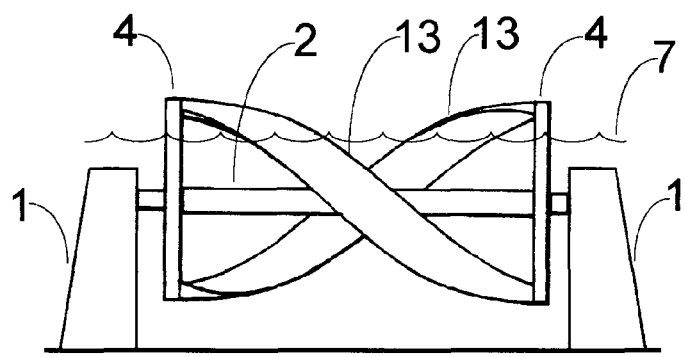
FIG. 8 is a frontal view down the direction of water flow of a helical-blade Darrieus turbine, according to another embodiment of the present invention.

A second alternate Darrieus turbine design to which the principle of the invention can be applied is shown in FIG. 8. This Darrieus turbine design, originally described in U.S. Pat. No. 6,036,443 and Canadian Patent 2222115, utilizes helical blades. By allowing any section of a helical blade 13 moving directly against the direction of water flow to travel through the air, stress on the blades is greatly reduced and no energy needs to be expended to push the sections through the fully opposite force of the flow. An improvement on the basic helical turbine design is thereby disclosed.

Figure 9:
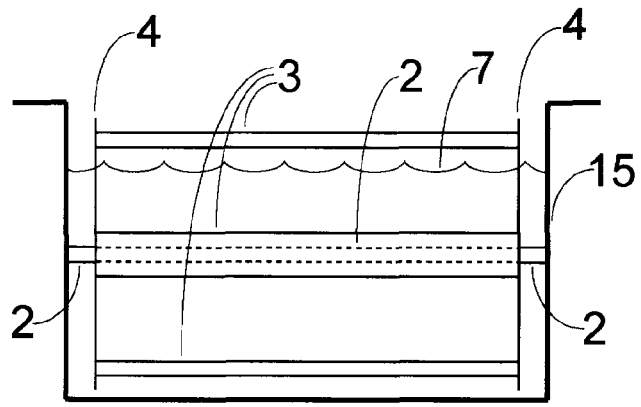
FIG. 9 is a frontal view down the direction of water flow of a Darrieus turbine in a channel, according to another embodiment of the present invention.

In an open water flow area some flow will pass around the turbine runner, imparting no energy. FIG. 9 is a frontal view down the direction of flow of an embodiment of the invention wherein a channel 15 minimizes this loss of flow. In this embodiment the turbine is fully surrounded by the walls and base of the channel 15. Almost all the flow is forced through the blades 3. The smaller the minimum gap between channel surfaces 15 and the blades 3, the higher the energy conversion efficiency. The Betz limit of energy conversion efficiency for turbines in open fluid flow (59.3%) may thereby be exceeded without the construction of ducts, penstocks or significant additional civil works. Efficiencies approaching that of traditional reaction turbines are theoretically possible.

I claim:

1. A reaction turbine system for harnessing energy from liquid flow comprising a shaft; a shaft support which elevates the shaft, permits rotation of the shaft and orients the longitudinal axis of the shaft horizontally and perpendicular to the direction of liquid flow; at least one blade support member fixedly mounted to the shaft for rotation in a plane perpendicular to the longitudinal axis of the shaft; a plurality of turbine blades mounted to the at least one blade support member, each turbine blade being straight or helical, maintaining for the full length of the turbine blade a constant radial distance from the shaft as the other turbine blades, and having a tear-dropped airfoil cross-section oriented in the same direction around the circle of rotation as the other turbine blades; with the reaction turbine system arranged such that the section of the reaction turbine system where the turbine blades rotate directly against the direction of liquid flow is outside the liquid flow, wherein the liquid flow is in the form of a jet of liquid directed at the reaction turbine system.

2. The reaction turbine system of claim 1, wherein at least one blade support member is a circular disc.

3. The reaction turbine system of claim 1, wherein at least one blade support member is a plurality of radial spokes.

4. The reaction turbine system of claim 1, wherein each turbine blade is helical.

5. The reaction turbine system of claim 1, wherein a liquid deflection barrier, consisting of one or more plates, deflects the jet of liquid from directly striking the top section of the reaction turbine system where the turbine blades move directly against the direction of liquid flow.

6. The reaction turbine system of claim 1, wherein the reaction turbine system is enclosed by a liquid flow channel.

7. The reaction turbine system of claim 1, wherein the shaft is connected to a power generator.

8. The reaction turbine system of claim 1, wherein the shaft is connected to a gearing system connected to a power generator.

9. A reaction turbine system for harnessing energy from liquid flow comprising a shaft, at least two shaft supports which elevate the shaft, permit rotation of the shaft and orient the longitudinal axis of the shaft horizontally and perpendicular to the direction of liquid flow, and a plurality of Darrieus turbine modules arranged in series along the shaft, each Darrieus turbine module comprising: at least one blade support member fixedly mounted to the shaft for rotation in a plane perpendicular to the longitudinal axis of the shaft; and a plurality of turbine blades mounted to the blade support member(s) in the Darrieus turbine module, each turbine blade being wing shaped, having a constant tear-dropped airfoil cross-section along its longitudinal axis, having its longitudinal-axis parallel to the longitudinal axis of the shaft, mounted equidistant from the shaft as all other turbine blades in the reaction turbine system, having its airfoil cross-section oriented in the same direction around the circle of rotation as all the other turbine blades in the reaction turbine system, and having a longitudinal axis that does not coincide with the longitudinal axis of any blade in any adjacent Darrieus turbine module; with the reaction turbine system located such that the section of the reaction turbine system where the turbine blades rotate directly against the direction of liquid flow is elevated outside and above the liquid flow.

10. A reaction turbine system for harnessing energy from liquid flow comprising a shaft; a shaft support which elevates the shaft, permits rotation of the shaft and orients the longitudinal axis of the shaft horizontally and perpendicular to the direction of liquid flow; at least one blade support member fixedly mounted to the shaft for rotation in a plane perpendicular to the longitudinal axis of the shaft; a plurality of turbine blades mounted to the at least one blade support member, each turbine blade being straight or helical, maintaining for the full length of the turbine blade a constant radial distance from the shaft as the other turbine blades, and having a tear-dropped airfoil cross-section oriented in the same direction around the circle of rotation as the other turbine blades; with the reaction turbine system arranged such that the section of the reaction turbine system where the turbine blades rotate directly against the direction of liquid flow is outside the liquid flow, wherein an air pocket shell, consisting of one or more plates which surround the top section of the reaction turbine system and holds a pocket of air, is located such that the section of the reaction turbine system where the turbine blades rotate directly against the direction of liquid flow is inside the air pocket shell's pocket of air.

11. A method of using a Darrieus turbine in a flowing liquid, comprising:
orienting said Darrieus turbine in said flowing liquid such that at least a portion of each airfoil-shaped blade of said turbine, along its length, is directed transversely of said liquid flow; and operating said Darrieus turbine in said flowing liquid such that (i) while any portion of said each turbine blade is rotating in a direction opposite the direction of flow of said flowing liquid, said any portion is not immersed in said flowing liquid, and (ii) while said any portion is rotating in the direction of said liquid flow, said any portion is fully immersed in said flowing liquid, wherein said operating comprises fully immersing said Darrieus turbine in said flowing liquid and providing an air pocket for said any portion of each said turbine blade while said any portion is rotating in a direction opposite the direction of said flowing liquid.

12. The method of claim 11 wherein said operating comprises partially immersing said Darrieus turbine in said flowing liquid.

13. The method of claim 11 wherein said each turbine blade is straight and said each blade is directed transversely of said fluid flow.

14. A Darrieus turbine system comprising:
a plurality of blades supported for rotation about an axis of rotation, each blade, throughout its length, extending at a constant radial distance from said axis of rotation, each blade having an airfoil shape;
a flowing liquid;
said turbine oriented such that at least a portion of each blade of said turbine, along its length, is directed transversely of said fluid flow;
said turbine arranged such that (i) while any portion of said each turbine blade is rotating in a direction opposite the direction of flow of said flowing liquid, said any portion is not immersed in said flowing liquid, and (ii) while said any portion is rotating in the direction of said liquid flow, said any portion is fully immersed in said flowing liquid; and
further comprising an air pocket shell extending over said turbine and wherein said turbine is fully immersed in said flowing liquid with said air pocket shell providing an air pocket such that (i) while any portion of said each turbine blade is rotating in a direction opposite the direction of flow of said flowing liquid, said any portion is not immersed in said flowing liquid, and (ii) while said any portion is rotating in the direction of said liquid flow, said any portion is fully immersed in said flowing liquid.

15. The system of claim 14 wherein each of said blades has a tear-dropped shaped cross-section.

16. The turbine system of claim 15 wherein said turbine is partially immersed in said flowing liquid such that (i) while any portion of said each turbine blade is rotating in a direction opposite the direction of flow of said flowing liquid, said any portion is not immersed in said flowing liquid, and (ii) while said any portion is rotating in the direction of said liquid flow, said any portion is fully immersed in said flowing liquid.

17. The turbine system of claim 14 wherein each turbine blade is straight such that an entirety of each blade of said turbine, along its length, is directed transversely of said fluid flow.

18. A method of using a Darrieus turbine in a flowing liquid, comprising:
orienting said Darrieus turbine in said flowing liquid such that at least a portion of each airfoil-shaped blade of said turbine, along its length, is directed transversely of said liquid flow; and operating said Darrieus turbine in said flowing liquid such that (i) while any portion of said each turbine blade is rotating in a direction opposite the direction of flow of said flowing liquid, said any portion is not immersed in said flowing liquid, and (ii) while said any portion is rotating in the direction of said liquid flow, said any portion is fully immersed in said flowing liquid, wherein said operating comprises directing a jet of liquid at said Darrieus turbine, said jet of liquid being said flowing liquid.

* * * * *